(12) United States Patent
Paul (10) Patent No.: US 11,388,132 B1
(45) Date of Patent: Jul. 12, 2022

(54) AUTOMATED SOCIAL MEDIA REPLIES (71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/425,909

(22) Filed: May 29, 2019

(51) Int. Cl.
H04L 51/52 (2022.01)
G06F 3/0482 (2013.01)
G06F 3/04842 (2022.01)
H04L 51/10 (2022.01)
G06F 3/04817 (2022.01)
H04L 51/02 (2022.01)

(52) U.S. Cl.
CPC ............ H04L 51/32 (2013.01); G06F 3/0482 (2013.01); G06F 3/04817 (2013.01); G06F 3/04842 (2013.01); H04L 51/02 (2013.01); H04L 51/10 (2013.01)

(58) Field of Classification Search
CPC .............. G06F 3/04817; G06F 3/0482; G06F 3/04842; H04L 51/32; H04L 51/02; H04L 51/10
See application file for complete search history.

(56) References Cited

U.S. PATENT DOCUMENTS

| D341,848 | S | 11/1993 | Bigelow et al. |
| D418,496 | S | 1/2000 | Baker et al. |
| D436,580 | S | 1/2001 | Navano et al. |
| D478,912 | S | 8/2003 | Johnson |
| D491,955 | S | 6/2004 | Ording et al. |
| D536,702 | S | 2/2007 | Parta |
| D556,768 | S | 12/2007 | Morris |
| D568,333 | S | 5/2008 | Okaro et al. |
| D575,792 | S | 8/2008 | Benson |
| D596,192 | S | 7/2009 | Shotel |
| D596,646 | S | 7/2009 | Wani |
| 7,636,889 | B2 | 12/2009 | Weber et al. |
| D608,366 | S | 1/2010 | Matas |
| D620,949 | S | 8/2010 | Loken |
| 7,810,037 | B1 * | 10/2010 | Edwards ............... G06Q 10/10 715/749 |
| D631,888 | S | 2/2011 | Vance et al. |

(Continued)

OTHER PUBLICATIONS

Notice of Allowance received for U.S. Appl. No. 16/425,908 dated Jan. 15, 2020, 22 pages.

(Continued)

Primary Examiner — Tadesse Hailu
(74) Attorney, Agent, or Firm — FisherBroyles, LLP (57) ABSTRACT Systems and methods for creating and maintaining an interactive time display may include (1) presenting a social media post within a consumption interface of a social media platform, (2) predicting a viewer's response to the post and selecting an automated digital response that coincides with the predicted response, (3) providing a selectable version of the automated digital response within the consumption interface, (4) receiving user input selecting the automated digital response, and (5) in response to receiving the user input, posting the automated digital response to the post. Various other methods, systems, and computer-readable media are also disclosed.

20 Claims, 7 Drawing Sheets

(56) References Cited

U.S. PATENT DOCUMENTS

| | | |
|---|---|---|
| D637,604 S | 5/2011 | Brinda |
| D637,606 S | 5/2011 | Luke et al. |
| 8,136,039 B2 | 3/2012 | Ebrom et al. |
| 8,147,251 B1 | 4/2012 | Anson |
| 8,230,343 B2 | 7/2012 | Logan et al. |
| D671,127 S | 11/2012 | Woo et al. |
| D671,552 S | 11/2012 | Mori et al. |
| D673,166 S | 12/2012 | Mori et al. |
| D682,307 S | 5/2013 | Donahue et al. |
| D687,062 S | 7/2013 | Gardner et al. |
| D692,450 S | 10/2013 | Convay et al. |
| D696,263 S | 12/2013 | Ray et al. |
| D698,686 S | 2/2014 | Saikawa et al. |
| D698,813 S | 2/2014 | Brown |
| D707,706 S | 6/2014 | Cranfill et al. |
| 8,823,654 B2 | 9/2014 | Jeong et al. |
| 8,862,978 B2 | 10/2014 | Evans |
| D717,816 S | 11/2014 | Zuckerberg et al. |
| D723,584 S | 3/2015 | Van Slembrouck |
| D726,197 S | 4/2015 | Kim et al. |
| D727,941 S | 4/2015 | Angelides |
| D729,271 S | 5/2015 | Zhang et al. |
| D739,413 S | 9/2015 | Shin et al. |
| D739,866 S | 9/2015 | Urdan et al. |
| D740,849 S | 10/2015 | Zou |
| D741,355 S | 10/2015 | Zou |
| 9,158,741 B1 | 10/2015 | Hansen |
| D750,661 S | 3/2016 | Funnell, II et al. |
| 9,274,696 B1 | 3/2016 | Mierau et al. |
| 9,292,166 B2 | 3/2016 | Rivera et al. |
| D753,699 S | 4/2016 | Tsukamoto |
| D756,396 S | 5/2016 | Anzures et al. |
| D759,722 S | 6/2016 | Kemp |
| D760,243 S | 6/2016 | Ostrowski et al. |
| 9,361,322 B1 | 6/2016 | Dutta et al. |
| D760,782 S | 7/2016 | Kendler et al. |
| D761,845 S | 7/2016 | Haitani et al. |
| D763,317 S | 8/2016 | Kim et al. |
| D763,881 S | 8/2016 | Smith et al. |
| 9,424,881 B2 | 8/2016 | Casagrande |
| D766,308 S | 9/2016 | Park et al. |
| 9,443,328 B2 | 9/2016 | Lee et al. |
| D768,203 S | 10/2016 | Kemp |
| D769,295 S | 10/2016 | Han et al. |
| D771,111 S | 11/2016 | Roberts et al. |
| D772,930 S | 11/2016 | Vazquez et al. |
| D774,051 S | 12/2016 | Hart et al. |
| 9,529,492 B2 | 12/2016 | Cho et al. |
| D777,768 S | 1/2017 | Persson et al. |
| D777,787 S | 1/2017 | Kemp |
| 9,557,876 B2 | 1/2017 | Matas |
| D778,310 S | 2/2017 | Roberts et al. |
| D778,311 S | 2/2017 | Denis et al. |
| 9,589,538 B2 | 3/2017 | Davidson et al. |
| D783,658 S | 4/2017 | Hurst et al. |
| 9,641,898 B2 | 5/2017 | Bloch et al. |
| D789,977 S | 6/2017 | Mijatovic et al. |
| D791,164 S | 7/2017 | Rice et al. |
| D794,651 S | 8/2017 | Cavander et al. |
| 9,727,927 B2 * | 8/2017 | Juan .............. G06Q 10/10 |
| 9,772,738 B2 | 9/2017 | Na et al. |
| D800,762 S | 10/2017 | Aoshima |
| D801,992 S | 11/2017 | Fischbach |
| D804,509 S | 12/2017 | Hurst et al. |
| D804,510 S | 12/2017 | Federighi et al. |
| D805,097 S | 12/2017 | Chaudhri et al. |
| D805,543 S | 12/2017 | Baker |
| D809,001 S | 1/2018 | Funnell, II et al. |
| D812,089 S | 3/2018 | Walkin |
| D812,098 S | 3/2018 | Chung |
| D812,641 S | 3/2018 | Walkin |
| D814,504 S | 4/2018 | Lee et al. |
| 9,936,184 B2 | 4/2018 | Kaiser et al. |
| 9,959,012 B2 | 5/2018 | Rivera et al. |
| D820,857 S | 6/2018 | Sutton et al. |
| D820,867 S | 6/2018 | Dickens et al. |
| D822,702 S | 7/2018 | Gandhi et al. |
| D823,333 S | 7/2018 | Hiratsukta et al. |
| D824,944 S | 8/2018 | Sagrillo et al. |
| D824,945 S | 8/2018 | Sagrillo et al. |
| D830,406 S | 10/2018 | Baldi et al. |
| D831,065 S | 10/2018 | Walkin et al. |
| D832,299 S | 10/2018 | Lamperti et al. |
| D833,465 S | 11/2018 | Variamohan |
| 10,140,650 B2 | 11/2018 | Roberts |
| D836,121 S | 12/2018 | Leong et al. |
| 10,226,200 B2 | 3/2019 | Vassallo et al. |
| D845,991 S | 4/2019 | Kessler et al. |
| D846,587 S | 4/2019 | Behzadi et al. |
| D846,597 S | 4/2019 | Isaacs et al. |
| D847,825 S | 5/2019 | Coren |
| D847,850 S | 5/2019 | Kim et al. |
| D849,769 S | 5/2019 | Matas |
| D852,213 S | 6/2019 | Clediere et al. |
| D852,216 S | 6/2019 | Westerhold et al. |
| D852,832 S | 7/2019 | Westerhold et al. |
| D854,042 S | 7/2019 | Sagrillo et al. |
| 10,348,658 B2 * | 7/2019 | Rodriguez .......... H04L 65/403 |
| D859,446 S | 9/2019 | Westerhold et al. |
| D861,715 S | 10/2019 | Haile et al. |
| D863,333 S | 10/2019 | Westerhold et al. |
| D864,990 S | 10/2019 | Lee et al. |
| D864,994 S | 10/2019 | Cornell |
| D865,794 S | 11/2019 | Lee et al. |
| D865,795 S | 11/2019 | Koo |
| D866,582 S | 11/2019 | Chang et al. |
| 10,467,238 B2 | 11/2019 | Loomans et al. |
| D871,438 S | 12/2019 | Nakahara et al. |
| D872,731 S | 1/2020 | Wang et al. |
| D873,843 S | 1/2020 | Jang et al. |
| D873,849 S | 1/2020 | Yamazaki et al. |
| 10,535,106 B2 * | 1/2020 | Mashiach ............ G06Q 50/01 |
| D874,491 S | 2/2020 | Kuo et al. |
| D874,504 S | 2/2020 | Clediere |
| D875,112 S | 2/2020 | Clediere |
| D875,114 S | 2/2020 | Clediere |
| D875,126 S | 2/2020 | Greco et al. |
| 10,559,224 B2 | 2/2020 | Ternoey |
| D877,188 S | 3/2020 | Williams |
| D878,411 S | 3/2020 | Lee et al. |
| D879,131 S | 3/2020 | Friedland et al. |
| D879,807 S | 3/2020 | Clediere |
| D880,493 S | 4/2020 | Huang et al. |
| D880,500 S | 4/2020 | Clediere |
| D881,925 S | 4/2020 | Hansen et al. |
| 10,623,831 B1 | 4/2020 | Paul |
| 10,637,816 B1 | 4/2020 | Brooks et al. |
| D884,013 S | 5/2020 | Clediere |
| D884,733 S | 5/2020 | Cornell |
| D885,415 S | 5/2020 | Deng |
| 10,645,054 B1 * | 5/2020 | Lewis .............. G06F 3/0483 |
| D886,127 S | 6/2020 | Conover et al. |
| D887,438 S | 6/2020 | Kang et al. |
| D887,439 S | 6/2020 | Elgena |
| D888,070 S | 6/2020 | Yusupov et al. |
| D888,089 S | 6/2020 | Chaudhri et al. |
| D888,733 S | 6/2020 | Fong et al. |
| D888,738 S | 6/2020 | Chang et al. |
| 10,684,738 B1 * | 6/2020 | Sicora .............. G06F 16/435 |
| D889,487 S | 7/2020 | Clediere |
| D890,198 S | 7/2020 | Paul |
| D890,201 S | 7/2020 | Li et al. |
| D890,805 S | 7/2020 | Echeverri et al. |
| D892,140 S | 8/2020 | Clediere et al. |
| D892,156 S | 8/2020 | Boettner |
| D892,816 S | 8/2020 | Lakas et al. |
| D892,838 S | 8/2020 | Hansen et al. |
| D892,848 S | 8/2020 | McCollum et al. |
| D892,862 S | 8/2020 | Hsu et al. |
| D894,921 S | 9/2020 | Paul |
| D894,949 S | 9/2020 | Shuttleworth et al. |
| D895,662 S | 9/2020 | Zhao |
| D896,259 S | 9/2020 | Doti et al. |
| D897,353 S | 9/2020 | Hall et al. |

(56) References Cited

U.S. PATENT DOCUMENTS

| | | |
|---|---|---|
| D898,066 S | 10/2020 | Kim et al. |
| D898,074 S | 10/2020 | Spors et al. |
| D899,435 S | 10/2020 | Pazmino et al. |
| D899,438 S | 10/2020 | Crafts et al. |
| D899,443 S | 10/2020 | Sharp et al. |
| D899,448 S | 10/2020 | VanDuyn et al. |
| D900,146 S | 10/2020 | Lewis et al. |
| D900,148 S | 10/2020 | Bao |
| 10,817,142 B1 | 10/2020 | Paul |
| D900,834 S | 11/2020 | Yamazaki et al. |
| D900,859 S | 11/2020 | Satterlie et al. |
| D900,863 S | 11/2020 | Clingerman |
| D902,241 S | 11/2020 | Clediere |
| D902,248 S | 11/2020 | Vazquez et al. |
| D902,250 S | 11/2020 | Chen et al. |
| D902,947 S | 11/2020 | Boelte et al. |
| D903,699 S | 12/2020 | Paul |
| D903,707 S | 12/2020 | Sowden et al. |
| D903,708 S | 12/2020 | Poueriet |
| D904,421 S | 12/2020 | Hansen et al. |
| D904,423 S | 12/2020 | Hansen et al. |
| D904,425 S | 12/2020 | Paul |
| D904,433 S | 12/2020 | Paul |
| D905,074 S | 12/2020 | Lin et al. |
| D905,108 S | 12/2020 | Kang et al. |
| D910,064 S | 2/2021 | Paul |
| D910,649 S | 2/2021 | Paul |
| D910,663 S | 2/2021 | Clediere et al. |
| D911,378 S | 2/2021 | Woodson et al. |
| D911,382 S | 2/2021 | Devine et al. |
| D912,700 S | 3/2021 | Paul |
| D913,313 S | 3/2021 | Paul |
| D913,314 S | 3/2021 | Paul |
| D914,049 S | 3/2021 | Paul |
| D914,051 S | 3/2021 | Paul |
| D914,058 S | 3/2021 | Paul |
| D914,705 S | 3/2021 | Paul |
| D914,712 S | 3/2021 | Cielak et al. |
| D914,757 S | 3/2021 | Paul |
| 10,963,128 B1 | 3/2021 | Paul |
| D915,447 S | 4/2021 | Cohen et al. |
| D916,764 S | 4/2021 | Kirsanov et al. |
| D916,788 S | 4/2021 | Andress et al. |
| D916,915 S | 4/2021 | Paul |
| D917,533 S | 4/2021 | Paul |
| 10,970,884 B1 | 4/2021 | Yang et al. |
| D918,264 S | 5/2021 | Paul |
| D924,255 S | 7/2021 | Paul |
| D928,828 S | 8/2021 | Paul |
| 2003/0093790 A1 | 5/2003 | Logan et al. |
| 2007/0067738 A1 | 3/2007 | Flynt et al. |
| 2008/0092168 A1 | 4/2008 | Logan et al. |
| 2008/0235247 A1 | 9/2008 | Krantz et al. |
| 2009/0046057 A1 | 2/2009 | Umezawa |
| 2009/0258710 A1 | 10/2009 | Quatrochi et al. |
| 2009/0265628 A1 | 10/2009 | Bamford et al. |
| 2010/0088726 A1 | 4/2010 | Curtis et al. |
| 2010/0241961 A1 | 9/2010 | Peterson et al. |
| 2010/0241962 A1 | 9/2010 | Peterson et al. |
| 2011/0145751 A1 | 6/2011 | Landman et al. |
| 2011/0166777 A1 | 7/2011 | Chavakula |
| 2012/0005224 A1* | 1/2012 | Ahrens ............... G06F 16/285 707/769 |
| 2012/0036552 A1 | 2/2012 | Dare et al. |
| 2012/0087637 A1 | 4/2012 | Logan et al. |
| 2012/0159318 A1 | 6/2012 | Shaw et al. |
| 2012/0209815 A1 | 8/2012 | Carson et al. |
| 2012/0296739 A1 | 11/2012 | Cassidy et al. |
| 2012/0299933 A1 | 11/2012 | Lau et al. |
| 2013/0166382 A1 | 6/2013 | Cassidy et al. |
| 2013/0198661 A1 | 8/2013 | Matas |
| 2013/0205243 A1 | 8/2013 | Rivera et al. |
| 2013/0210528 A1 | 8/2013 | Pereira et al. |
| 2013/0227414 A1 | 8/2013 | Hwang et al. |
| 2013/0314341 A1 | 11/2013 | Lee et al. |
| 2013/0321340 A1 | 12/2013 | Seo et al. |
| 2014/0025796 A1 | 1/2014 | Vibhor et al. |
| 2014/0082497 A1 | 3/2014 | Chalouhi et al. |
| 2014/0096062 A1 | 4/2014 | Luu et al. |
| 2014/0104320 A1 | 4/2014 | Davidson et al. |
| 2014/0189539 A1* | 7/2014 | St. Clair ............... G06Q 50/01 715/753 |
| 2014/0189607 A1 | 7/2014 | Shuttleworth et al. |
| 2014/0215367 A1 | 7/2014 | Kim et al. |
| 2014/0218393 A1 | 8/2014 | Lee et al. |
| 2014/0222512 A1 | 8/2014 | Pace |
| 2014/0282084 A1* | 9/2014 | Murarka ............... H04L 51/32 715/752 |
| 2014/0298233 A1 | 10/2014 | Pettey et al. |
| 2014/0321832 A1 | 10/2014 | Shore |
| 2014/0359443 A1 | 12/2014 | Hwang |
| 2015/0089369 A1 | 3/2015 | Ahm |
| 2015/0106856 A1 | 4/2015 | Rankine |
| 2015/0113443 A1 | 4/2015 | Breger et al. |
| 2015/0121252 A1 | 4/2015 | Yerli |
| 2015/0220774 A1* | 8/2015 | Ebersman ............ G06F 3/0482 382/118 |
| 2015/0223308 A1 | 8/2015 | Yen |
| 2015/0326912 A1 | 11/2015 | Casagrande |
| 2016/0011758 A1 | 1/2016 | Dornbush et al. |
| 2016/0034133 A1 | 2/2016 | Wilson et al. |
| 2016/0037217 A1 | 2/2016 | Harmon et al. |
| 2016/0072841 A1 | 3/2016 | Caporal et al. |
| 2016/0078471 A1* | 3/2016 | Hamedi ............. H04L 67/1072 705/14.41 |
| 2016/0094875 A1 | 3/2016 | Peterson et al. |
| 2016/0100224 A1 | 4/2016 | Nordstrom |
| 2016/0149956 A1 | 5/2016 | Birnbaum et al. |
| 2016/0155063 A1* | 6/2016 | Rich ................ G06F 16/24578 706/12 |
| 2016/0225030 A1* | 8/2016 | Iyer ..................... G06Q 50/01 |
| 2016/0255082 A1* | 9/2016 | Rathod ................ H04L 51/32 726/1 |
| 2016/0277528 A1 | 9/2016 | Guilaume et al. |
| 2016/0277802 A1* | 9/2016 | Bernstein ............ H04N 21/431 |
| 2016/0309321 A1 | 10/2016 | Song et al. |
| 2016/0314120 A1 | 10/2016 | Dauderman et al. |
| 2016/0328100 A1 | 11/2016 | Rajaraman et al. |
| 2016/0357413 A1 | 12/2016 | Block et al. |
| 2016/0357420 A1 | 12/2016 | Wilson et al. |
| 2016/0381110 A1 | 12/2016 | Barnett et al. |
| 2016/0381427 A1 | 12/2016 | Taylor et al. |
| 2017/0038843 A1 | 2/2017 | Flynn, III et al. |
| 2017/0109008 A1 | 4/2017 | Darby et al. |
| 2017/0149714 A1* | 5/2017 | Valdivia ............... H04L 51/32 |
| 2017/0185581 A1* | 6/2017 | Bojja .................. G06F 40/242 |
| 2017/0199916 A1 | 7/2017 | Loomans et al. |
| 2017/0250931 A1* | 8/2017 | Ioannou ............... H04L 67/18 |
| 2017/0277691 A1* | 9/2017 | Agarwal ................ H04W 4/21 |
| 2017/0295119 A1* | 10/2017 | Rosenberg ............ H04L 51/16 |
| 2017/0308290 A1* | 10/2017 | Patel ................. G06F 3/04817 |
| 2017/0329465 A1 | 11/2017 | Hong |
| 2017/0336928 A1* | 11/2017 | Chaudhri ............ G06F 3/04883 |
| 2017/0337841 A1 | 11/2017 | Styles |
| 2018/0039406 A1* | 2/2018 | Kong ..................... G06F 9/451 |
| 2018/0041461 A1* | 2/2018 | Kurani .................. H04L 51/10 |
| 2018/0067641 A1 | 3/2018 | Lerner et al. |
| 2018/0082313 A1* | 3/2018 | Duggin ................. G06N 20/00 |
| 2018/0173692 A1* | 6/2018 | Greenberg .......... G06F 3/04842 |
| 2018/0188916 A1* | 7/2018 | Lyons ................. G06F 3/0482 |
| 2018/0210874 A1* | 7/2018 | Fuxman ............... G06N 3/0454 |
| 2018/0218458 A1* | 8/2018 | Benfield ............... G06F 16/41 |
| 2018/0302682 A1* | 10/2018 | Saxena ................. G06Q 50/01 |
| 2018/0309843 A1* | 10/2018 | Chandra ............... H04L 67/26 |
| 2018/0335920 A1 | 11/2018 | Tyler |
| 2019/0034534 A1* | 1/2019 | Khandelwal ......... G06K 9/4604 |
| 2019/0049394 A1 | 2/2019 | Iwao |
| 2019/0065610 A1* | 2/2019 | Singh ................. G06F 16/9535 |
| 2019/0075340 A1 | 3/2019 | Hochart |
| 2019/0147017 A1 | 5/2019 | Tran |
| 2019/0200051 A1 | 6/2019 | Paul et al. |
| 2019/0391727 A1 | 12/2019 | Gomez-Rosado et al. |
| 2020/0026755 A1* | 1/2020 | Hewitt ................. G06F 16/955 |
| 2020/0111173 A1* | 4/2020 | Benfield ............. G06F 16/739 |

(56) References Cited

U.S. PATENT DOCUMENTS

| | | | |
|---|---|---|---|
| 2020/0226173 A1 | 7/2020 | Zhang et al. | |
| 2020/0233911 A1 | 7/2020 | Siroker et al. | |
| 2020/0257859 A1* | 8/2020 | Hewitt | H04L 51/32 |
| 2021/0060447 A1 | 3/2021 | Vaccar et al. | |

OTHER PUBLICATIONS

Paul, Debashish, "Macro-Navigation within a Digital Story Framework", U.S. Appl. No. 16/416,312 dated May 20, 2019, 51 pages.

Paul, Debashish, "Interactive Digital Time Display", U.S. Appl. No. 16/416,313 dated May 20, 2019, 46 pages.

Paul, Debashish, "Archive Full-Story Mode", U.S. Appl. No. 29/693,993 dated Jun. 6, 2019, 11 pages.

Paul, Debashish, "Archive Calendar Interface", U.S. Appl. No. 29/693,991 dated Jun. 6, 2019, 11 pages.

Paul, Debashish, "Archive Montage Interface", U.S. Appl. No. 29/693,989 dated Jun. 6, 2019, 11 pages.

Paul, Debashish, "Systems and Methods for Digital Privacy Controls", U.S. Appl. No. 16/425,907 dated May 29, 2019, 45 pages.

Notice of Allowance received for U.S. Appl. No. 16/425,907 dated Apr. 9, 2020, 29 pages.

Paul, Debashish, "Systems and Methods for Digital Privacy Controls", U.S. Appl. No. 15/931,145, filed May 13, 2020, 49 pages.

Notice of Allowance received for U.S. Appl. No. 16/416,312 dated Jul. 31, 2020, 53 pages.

Notice of Allowance received for U.S. Appl. No. 29/693,993 dated Dec. 24, 2020, 41 pages.

Notice of Allowance received for U.S. Appl. No. 29/693,989 dated Dec. 28, 2020, 42 pages.

Notice of Allowance received for U.S. Appl. No. 29/688,460 dated Dec. 23, 2020, 8 pages.

Notice of Allowance received for U.S. Appl. No. 29/688,457 dated Dec. 24, 2020, 8 pages.

Notice of Allowance received for U.S. Appl. No. 29/688,456 dated Dec. 23, 2020, 8 pages.

Notice of Allowance received for U.S. Appl. No. 29/688,452 dated Dec. 23, 2020, 8 pages.

Notice of Allowance received for U.S. Appl. No. 29/688,451 dated Dec. 23, 2020, 8 pages.

Notice of Allowance received for U.S. Appl. No. 29/693,878 dated Dec. 23, 2020, 8 pages.

Notice of Allowance received for U.S. Appl. No. 29/688,446 dated Dec. 23, 2020, 8 pages.

Notice of Allowance received for U.S. Appl. No. 29/693,880 dated Dec. 23, 2020, 47 pages.

Notice of Allowance received for U.S. Appl. No. 29/693,879 dated Dec. 23, 2020, 53 pages.

Notice of Allowance received for U.S. Appl. No. 29/693,992 dated Dec. 23, 2020, 45 pages.

Non-Final Office Action received for U.S. Appl. No. 29/693,993 dated Sep. 18, 2020, 24 pages.

Non-Final Office Action received for U.S. Appl. No. 29/693,991 dated Oct. 1, 2020, 24 pages.

Non-Final Office Action received for U.S. Appl. No. 29/693,989 dated Sep. 18, 2020, 24 pages.

Preinterview First Office Action received for U.S. Appl. No. 15/931,145 dated Sep. 22, 2020, 23 pages.

Non-Final Office Action received for U.S. Appl. No. 29/688,460 dated Aug. 7, 2020, 14 pages.

Non-Final Office Action received for U.S. Appl. No. 29/688,458 dated Aug. 7, 2020, 14 pages.

Non-Final Office Action received for U.S. Appl. No. 29/688,457 dated Aug. 7, 2020, 13 pages.

Non-Final Office Action received for U.S. Appl. No. 29/688,456 dated Aug. 7, 2020, 17 pages.

Non-Final Office Action received for U.S. Appl. No. 29/688,452 dated Aug. 7, 2020, 18 pages.

Non-Final Office Action received for U.S. Appl. No. 29/688,451 dated Aug. 7, 2020, 17 pages.

Non-Final Office Action received for U.S. Appl. No. 29/693,878 dated Sep. 17, 2020, 10 pages.

Non-Final Office Action received for U.S. Appl. No. 29/688,446 dated Aug. 7, 2020, 18 pages.

Non-Final Office Action received for U.S. Appl. No. 29/688,445 dated Aug. 7, 2020, 18 pages.

Non-Final Office Action received for U.S. Appl. No. 29/693,992 dated Sep. 18, 2020, 11 pages.

Non-Final Office Action received for U.S. Appl. No. 29/693,881 dated Sep. 18, 2020, 10 pages.

Non-Final Office Action received for U.S. Appl. No. 29/693,880 dated Sep. 18, 2020, 9 pages.

Non-Final Office Action received for U.S. Appl. No. 29/693,879 dated Sep. 18, 2020, 9 pages.

Paul, Debashish, "Macro-Navigation Within a Digital Story Framework", U.S. Appl. No. 17/023,091 dated Sep. 16, 2020, 53 pages.

Notice of Allowance received for U.S. Appl. No. 29/688,460 dated Dec. 1, 2020, 40 pages.

Buckell, FabioMake, "Howto Create and Personalize Facebook Stories", URL: https://www.maketecheasier.com/create-personalize-facebook-stories/, Make Tech Easier, Nov. 17, 2018, 2 pages.

Notice of Allowance received for U.S. Appl. No. 29/688,458 dated Dec. 1, 2020, 40 pages.

Kishore, Aseem, "How to Delete Messages on Facebook for Good", URL: https://www.online-tech-tips.com/computer-tips/how-to-delete-messages-on-facebook-for-good/, Online Tech Tips, Jun. 22, 2012, 1 page.

Notice of Allowance received for U.S. Appl. No. 29/688,457 dated Dec. 1, 2020, 39 pages.

Notice of Allowance received for U.S. Appl. No. 29/688,456 dated Nov. 25, 2020, 40 pages.

Notice of Allowance received for U.S. Appl. No. 29/688,452 dated Dec. 1, 2020, 40 pages.

Notice of Allowance received for U.S. Appl. No. 29/688,451 dated Nov. 25, 2020, 39 pages.

Notice of Allowance received for U.S. Appl. No. 29/693,878 dated Nov. 27, 2020, 39 pages.

Notice of Allowance received for U.S. Appl. No. 29/688,446 dated Dec. 1, 2020, 39 pages.

Notice of Allowance received for U.S. Appl. No. 29/767,680 dated Apr. 7, 2021, 20 pages.

Notice of Allowance received for U.S. Appl. No. 29/767,684 dated Apr. 6, 2021, 20 pages.

Notice of Allowance received for U.S. Appl. No. 29/688,445 dated Apr. 7, 2021, 24 pages.

Notice of Allowance received for U.S. Appl. No. 29/693,991 dated Feb. 18, 2021, 49 pages.

Non-Final Office Action received for U.S. Appl. No. 29/688,445 dated Feb. 16, 2021, 26 pages.

Notice of Allowance received for U.S. Appl. No. 29/693,881 dated Feb. 18, 2021, 53 pages.

Non-Final Office Action received for U.S. Appl. No. 29/767,680 dated Mar. 4, 2021, 41 pages.

Non-Final Office Action received for U.S. Appl. No. 29/767,684 dated Mar. 4, 2021, 41 pages.

Preinterview First Office Action received for U.S. Appl. No. 16/416,313 dated May 12, 2021, 24 pages.

Final Office Action received for U.S. Appl. No. 15/931,145 dated May 14, 2021, 67 pages.

Notice of Allowance received for U.S. Appl. No. 29/767,685 dated May 3, 2021, 61 pages.

Notice of Allowance received for U.S. Appl. No. 29/774,641 dated May 3, 2021, 24 pages.

Notice of Allowance received for U.S. Appl. No. 29/774,874 dated May 4, 2021, 23 pages.

Non-Final Office Action received for U.S. Appl. No. 17/023,091 dated Sep. 16, 2021, 111 pages.

U.S. Appl. No. 17/023,091, filed Sep. 16, 2020.

* cited by examiner

AUTOMATED SOCIAL MEDIA REPLIES

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Social media applications allow users to connect socially online. Some such applications may allow a user to create social media compositions that may be posted to other users. Once posted, viewers of the compositions may post replies to a composition. Such replies may take many forms (e.g., an icon-based reply such as an emoji reply, a message-based reply, a reply-composition, etc.). In traditional frameworks, a consumption interface, which displays posted compositions to a viewer, may include one or more standard selectable reply elements. For example, a consumption interface may include one or more selectable emojis and/or a text box for submitting a text message response.

Traditionally, such selectable reply elements may be standard. That is, the selectable reply elements may be the same for each composition, regardless of the composition's content, the composition's creator, the composition's audience, etc. However, as is often the case, one size may not fit all. In other words, a selectable reply element that is most appropriate for one composition may not be the most appropriate for another. As a specific example, a smiley emoji may be a standard emoji to have presented as a first option for leaving emoji-feedback for a composition. However, this standard selectable reply element may be inappropriate for a composition dealing with a sad event.

Responding to this, the instant disclosure identifies a need for improved systems and methods for tailoring automated reply content to a composition being viewed and/or a viewer viewing the composition. In one example, the disclosed automated reply system may include presenting predictive icons (e.g., moodie-emojis) alongside a composition within a consumption interface, which the viewer may assign to the composition as a form of commenting on the composition. In this example, the automated reply system may (1) predict which icons a viewer is most likely to wish to assign to the composition and (2) present the predicted icons based on the prediction. The prediction may be based on a variety of factors, such as the composition's content, the viewer's commenting history, and/or icons and/or comments posted to the composition by other viewers. In an additional or alternative example, the disclosed automated reply system may include providing a predictive pre-populated message within a private messaging interface relating to a composition. In one such example, the message may include text extracted from the composition.

In some embodiments, the disclosed automated reply system may provide a viewer summary sheet to a composition's producer. The viewer summary sheet may include a summary of each interaction between a viewer and a composition and may also be configured as a launching pad for the composition's producer to initiate a conversation with the viewer.

As will be explained in greater detail below, embodiments of the instant disclosure improve data presentation for users consuming digital social media. This may improve the functioning of a computer itself by improving the computer's ability to meaningfully organize and present data and receive user input.

Figure 1:
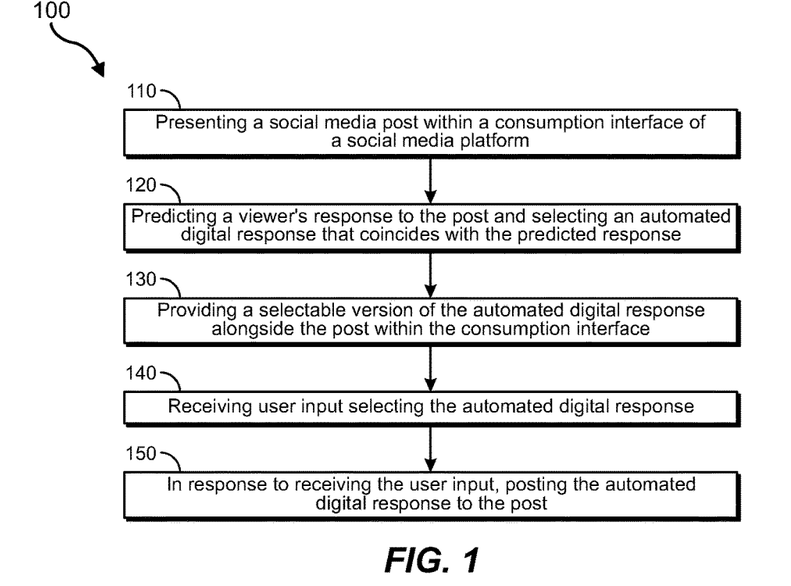
FIG. 1 is a flow diagram of an exemplary method for creating and providing automated social media replies.

The following will provide, with reference to FIG. 1, detailed descriptions of computer-implemented methods for creating and providing automated digital social media replies. Detailed descriptions of corresponding example systems will also be provided in connection with FIG. 2. In addition, detailed descriptions of corresponding social media interfaces will be provided in connection with FIGS. 3-8.

FIG. 1 is a flow diagram of an exemplary computer-implemented method 100 for creating and providing automated digital social media replies. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device, such as user device 204 (e.g., as shown in exemplary system 200 in FIG. 2).

Server 202 generally represents any type or form of backend computing device that performs one or more social networking functions as part of a social media platform 203 that manages server 202. Although illustrated as a single entity in FIG. 2, server 202 may include and/or represent a group of multiple servers that operate in conjunction with one another. User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

Figure 2:
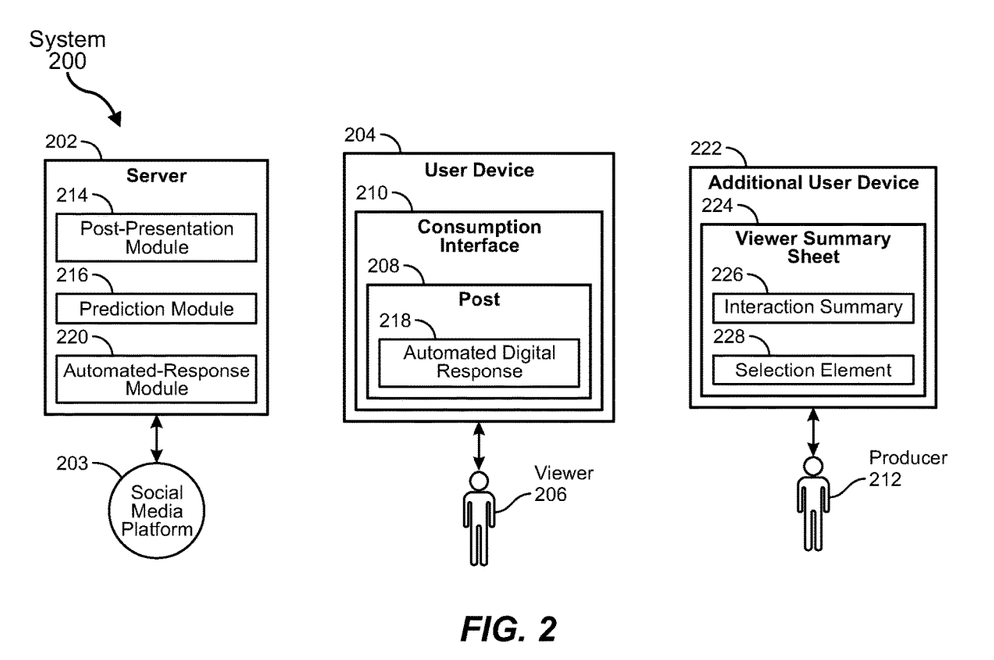
FIG. 2 is a block diagram of an exemplary system for creating and providing automated social media replies.

In some examples, a user of user device 204 (e.g., a viewer 206 of a post 208 posted via social media platform 203) may be a member of social media platform 203. In these examples, user device 204 may have installed an instance of a social networking application that operates as part of social media platform 203. Additionally or alternatively, user device 204 may have installed a browser that may navigate to one or more webpages maintained by social media platform 203. The social networking application and/or browser may provide a consumption interface 210, which may be presented via a display element of user device 204 and which may display content (e.g., social media posts such as post 208) received from server 202.

Consumption interface 210 generally represents any type or form of interface that displays social media posts, such as post 208, created by users of social media platform 203, that have been selected for viewer 206 to view. Post 208 may represent any type or form of social media composition created by a user of social media platform 203 (e.g., a producer 212) and posted to social media platform 203 (e.g., to be viewed by one or more additional users such as viewer 206). Post 208 may include a variety of content including, without limitation, a digital photograph, a digital video, a gif, text, a link, etc. A post, such as post 208, may be selected for viewer 206 to view based on one or more factors. In one example, a post may be selected for viewer 206 because a source of the post (e.g., a user who created the post) is one of viewer 206's contacts. In an additional or alternative example, a post may be selected for viewer 206 because viewer 206 is following a source of the post (that is, viewer 206 may have affirmatively elected to receive posts from the source of the post).

Figure 3:
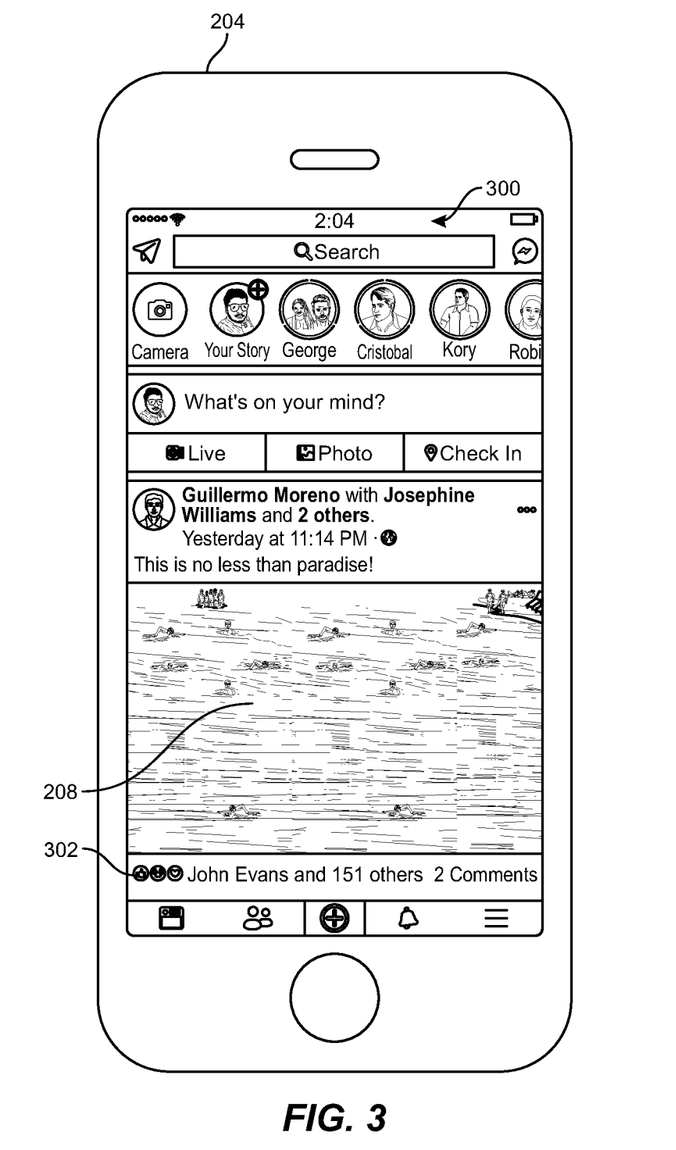
FIG. 3 is an illustration of an exemplary post within a digital newsfeed.

Consumption interface 210 may display posts using a variety of different flows. In some examples, consumption interface 210 may display social media posts in a stream in which the social media posts are linearly displayed one after another. In one such example, consumption interface 210 may represent a newsfeed. The term "newsfeed" as used herein generally refers to a social media consumption interface that presents a scrollable collection of social media compositions created by a particular user's contacts. FIG. 3 provides an exemplary illustration of a newsfeed interface 300 that includes post 208.

In some embodiments, consumption interface 210 may represent a digital story player that operates within a story framework of social media platform 203. In these examples, consumption interface 210 may display posts included within digital stories. The term "digital story" may refer to an ephemeral series of social media posts created by a particular source (e.g., a user such as producer 212) and added to the digital story within a designated time period. These posts may be displayed one at a time (e.g., in a slideshow format) and consumption interface 210 may be configured to transition from displaying one post to the next automatically and/or to transition in response to receiving user input.

Figure 4:
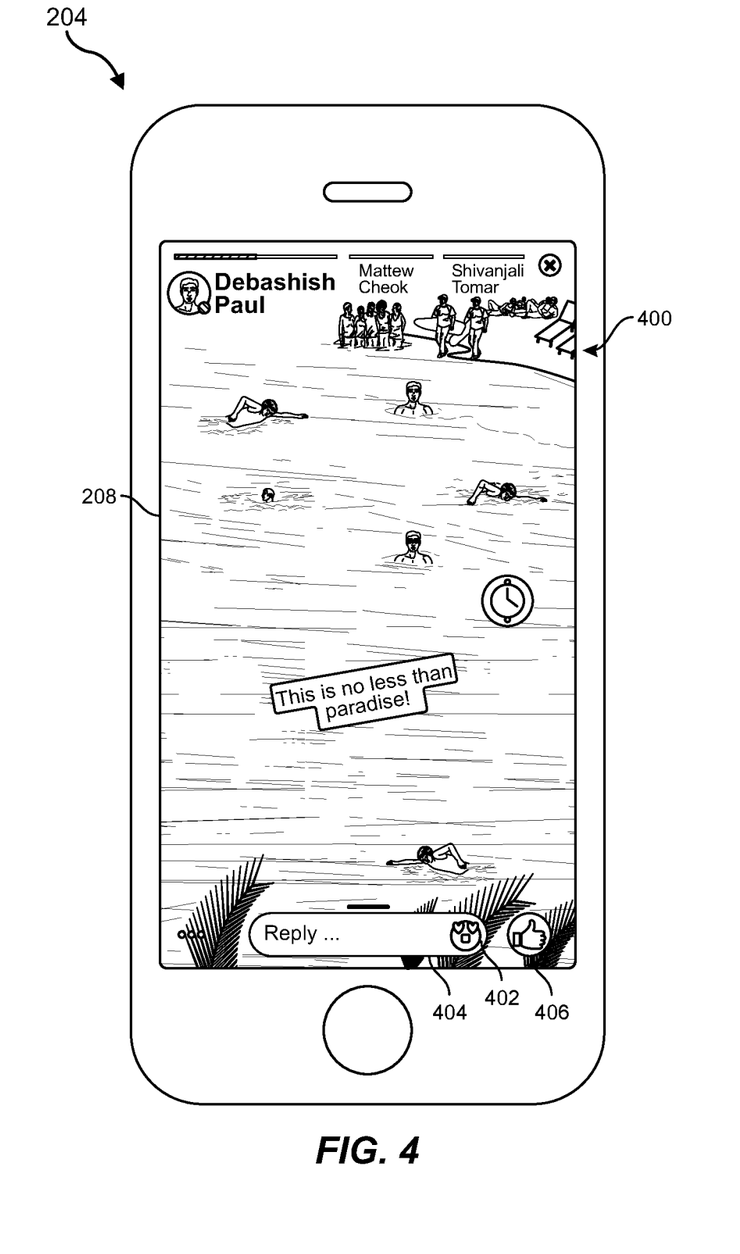
FIG. 4 is an illustration of an exemplary post within a digital story.

In some examples, the source of a digital story and/or a policy within social media platform 203 may designate an audience of one or more users who are able to view the digital story. Once added to the digital story, a post may be set to vanish (e.g., to no longer be accessible to the audience) after a designated length of time has passed. In a specific example, this designated length of time may be set at twenty-four hours. In this example, the digital story may be thought of as a single presentation (e.g., video and/or slideshow) of the source's day (i.e., the source's most recent twenty-four hours), which is continuously evolving as the source adds story-compositions to the digital story. FIG. 4 provides a specific example of post 208 being displayed within a digital story interface 400.

Returning to FIG. 1, at step 110, one or more of the systems described herein may present a social media post within a consumption interface of a social media platform. For example, as illustrated in FIG. 2, a post-presentation module 214 may present post 208 within consumption interface 210. FIG. 3 provides an exemplary illustration of post 208 being presented as a digital newsfeed post within an exemplary newsfeed consumption interface. FIG. 4 provides an exemplary illustration of post 208 being presented as a digital story post within an exemplary story consumption interface.

Returning to FIG. 1, at step 120, one or more of the systems described herein may predict a viewer's response to the post and select an automated digital response that coincides with the predicted response. For example, as illustrated in FIG. 2, a prediction module 216 may predict a response of viewer 206 to post 208 and select an automated digital response 218 that coincides with the predicted response.

Automated digital response 218 may refer to any type or form of digital response to a social media post. In one embodiment, automated digital response 218 may represent an emoji (e.g., a digital icon). Additionally or alternatively, automated digital response 218 may represent digital text (e.g., an automated pre-populated message). In some embodiments, automated digital response 218 may represent and/or include an image, a video clip, a GIF, and/or an audio segment. In one example, automated digital response 218 may represent a reply-composition, such as a reply story.

Prediction module 216 may predict viewer 206's response to post 208 in a variety of ways. In one embodiment, prediction module 216 may identify a digital response that has already been posted to post 208 more than a threshold amount. For example, prediction module 216 may identify a digital response that has been posted to post 208 more than a threshold number of times and/or may determine that more than a threshold percentage of the previous digital responses to post 208 have corresponded to a particular digital response.

Then, prediction module 216 may predict that viewer 206's response will align with the previously posted digital response. In response, prediction module 216 may predict that viewer 206 may be interested in posting the digital response that has already been posted to post 208 and/or in posting a digital response that aligns with the digital response that has already been posted to post 208. Based on this prediction, prediction module 216 may select, as automated digital response 218, the digital response that has already been posted to post 208 and/or a digital response that aligns with the digital response that has already been posted to post 208.

As a specific example, prediction module 216 may determine that more than a threshold number of emojis already posted to post 208, and/or more than a threshold percentage of the emojis already posted to post 208, have been an emoji of a sad face. In response, prediction module 216 may determine that viewer 206's response to post 208 may be represented by an emoji of a sad face (e.g., may be one of sadness and/or empathy). In response, prediction module 216 may predict that viewer 206 may be interested in posting, to post 208, an emoji of a sad face and/or a digital response that coincides with sadness and/or empathy. Based on this determination, prediction module 216 may select, as automated digital response 218, an emoji of a sad face and/or a digital response that coincides with sadness and/or empathy.

As an additional or alternative specific example, prediction module 216 may determine that more than a threshold number and/or percentage of messages and/or reply-compositions posted to post 208 include a particular word and/or phrase (e.g., "Congratulations!"), correspond to a particular emotion (e.g., joy), and/or relate to a particular theme (e.g., celebration). In this example, prediction module 216 may determine that viewer 206's response to post 208 will align with the identified word, phrase, emotion, and/or theme. Based on this determination, prediction module 216 may select, as automated digital response 218, the identified word and/or phrase and/or a digital response that aligns with the identified word, phrase, emotion, and/or theme.

In embodiments in which prediction module 216 bases its prediction on a previously posted digital response, the automated digital response selected by prediction module 216 may not necessarily take the same form as the responses previously posted to post 208. As a specific example, prediction module 216 may identify one or more messages offering condolences and may, in response, select, as automated digital response 218, an emoji of a heart.

In addition, or as an alternative, to predicting viewer 206's response based on previously posted responses, in some examples, prediction module 216 may predict viewer 206's response and/or select automated digital response 218 based on viewer 206's user history. For example, prediction module 216 may predict viewer 206's response and/or select automated digital response 218 based on responses selected and/or submitted by viewer 206 in the past.

Additionally or alternatively, prediction module 216 may predict viewer 206's response based on content within post 208. In this embodiment, prediction module 216 may (1) identify content within post 208, (2) predict that viewer 206's response will align with the content, and (3) select, as automated digital response 218, a digital response that matches the content and/or that aligns with the content.

In one such embodiment, prediction module 216 may identify text included within post 208. Using the exemplary embodiment of post 208 illustrated in FIGS. 3 and 4 as a specific example, prediction module 216 may identify the text "This is no less than paradise!" Then, prediction module 216 may predict that viewer 206's response may align with the identified text and may select a digital response that aligns with the identified text. In one example, prediction module 216 may select the identified text itself as automated digital response 218. Returning to our specific example, prediction module 216 may select the text "This is no less than paradise!" as automated digital response 218.

In additional or alternative examples in which prediction module 216 predicts viewer 206's response based on content within post 208, prediction module 216 may (1) identify content within post 208 and (2) identify an emotion and/or theme of the identified content. Then, prediction module 216 may predict that viewer 206's response will align with the identified emotion and/or theme. Based on this prediction, prediction module 216 may select, as automated digital response 218, a digital response that corresponds to the identified emotion and/or theme. As a specific example, prediction module 216 may determine that the content of post 208 aligns with a happy emotion and, in response, may predict that viewer 206's response will one of happiness. Based on this prediction, prediction module 216 may select, as automated digital response 218, a digital response that conveys happiness (e.g., an emoji of a smiling face).

In one embodiment, prediction module 216 may rely on machine learning (e.g., with one or more of the factors described above as inputs to a machine learning algorithm) to predict viewer 206's response and/or to select automated digital response 218.

Returning to FIG. 1, at step 130, one or more of the systems described herein may provide a selectable version of the automated digital response alongside the post within the consumption interface. For example, as illustrated in FIG. 2, an automated-response module 220 may provide a selectable version of automated digital response 218 alongside post 208 within consumption interface 210.

Automated-response module 220 may provide a selectable version of automated digital response 218 in a variety of ways (e.g., depending on the form of automated digital response 218). For example, in examples in which automated digital response 218 represents an emoji, automated-response module 220 may provide a selectable version of the emoji (e.g., alongside a reply portion of consumption interface 210). Using FIG. 4 as a specific example, automated-response module 220 may provide a heart-faced emoji 402 (i.e., in response to prediction module 216 having selected the heart-faced emoji based on a prediction that the heart-faced emoji may coincide with viewer 206's response to post 208).

Figure 5:
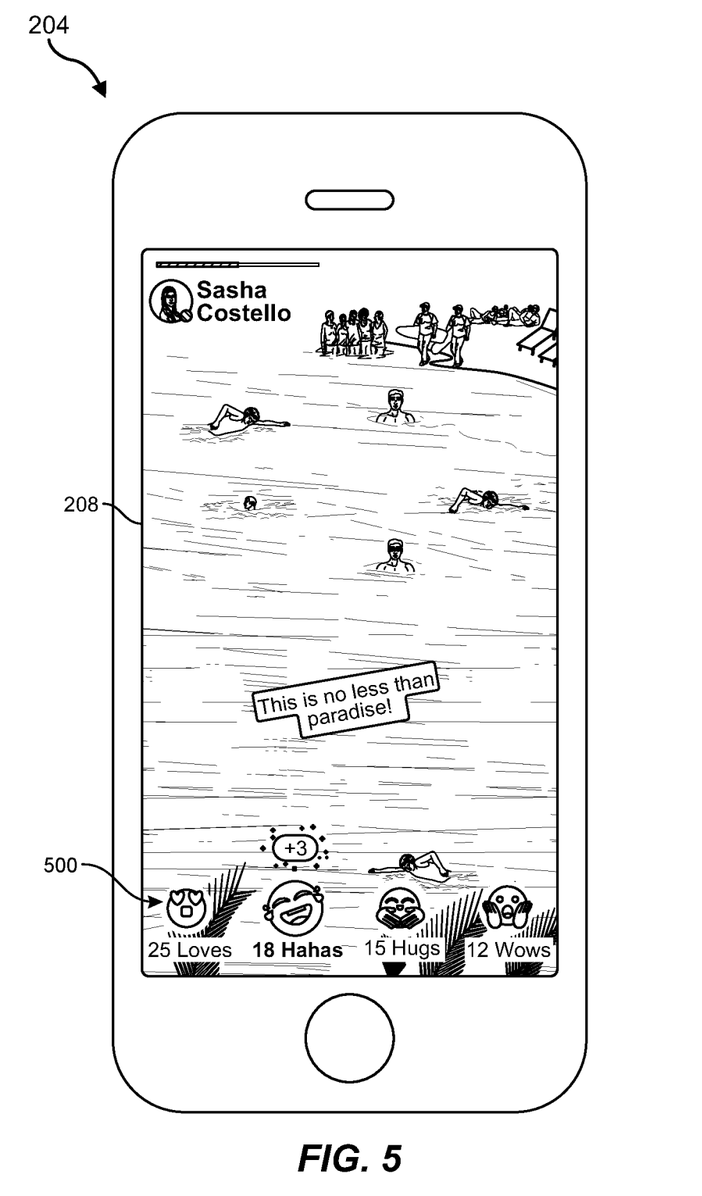
FIG. 5 is an illustration of an exemplary hover interface with exemplary automated digital reply elements.

In some examples, as illustrated in FIG. 4, automated-response module 220 may provide a single automated digital response. In other examples, automated-response module 220 may provide a collection of automated digital responses, enabling viewer 206 to select from among them. For example, FIG. 5 provides an exemplary illustration of a consumption interface overlay, presented in response to user input to consumption interface 210 (e.g., an upward scroll to a reply element 404 and/or a long press to an emoji located within reply element 404), that includes a set of automated emojis 500.

Additionally or alternatively, in examples in which automated digital response 218 represents digital text, post-presentation module 214 may provide (e.g., within consumption interface 210 and/or an interface associated with consumption interface 210) a messaging window and automated-response module 220 may provide automated digital response 218 as a pre-populated message within the messaging window. In some examples, the messaging window may represent a public messaging window (e.g., positioned beneath post 208 within consumption interface 210). In other examples, the messaging window may represent a private messaging window, accessible only to viewer 206 and one or more producers of post 208, such as producer 212.

In some examples, automated-response module 220 may include additional information about automated digital response 218. For example, in examples in which prediction module 216 selected automated digital response 218 based on responses to post 208 posted by other users, automated-response module 220 may indicate a number of users who have posted the response previously. FIG. 5 provides a specific example in which automated-response module 220 provides information indicating that a first love emoji was posted to post 208 twenty-five times, a second laughing emoji was posted to post 208 eighteen times, a third hug emoji was posted to post 208 fifteen times, and a fourth wow emoji was posted to post 208 twelve times.

In certain embodiments, automated-response module 220 may provide, within consumption interface 210, both a predictive automated response, which prediction module 216 tailored to post 208 as discussed in connection with step 120, and a generic automated response. Using FIG. 4 as a specific example, automated-response module 220 may provide, within consumption interface 210, both heart-faced emoji 402, which may have been selected based on prediction module 216's tailored prediction discussed in connection with step 120, and a generic thumbs-up emoji 406, which may be systematically included in every post presented within consumption interface 210.

Returning to FIG. 1, at step 140, one or more of the systems described herein may receive user input selecting the automated digital response. For example, as illustrated in FIG. 2, automated-response module 220 may receive user input selecting automated digital response 218. Automated-response module 220 may receive a variety of different types of user input, including, without limitation, a tap to a touchscreen of user device 204 to an area of the touchscreen corresponding to automated digital response 218 and/or input to an auxiliary device communicatively coupled to user device 204.

Finally, at step 150, one or more of the systems described herein may, in response to receiving the user input, post the automated response to the post. For example, as illustrated in FIG. 2, automated-response module 220 may post automated digital response 218 to post 208.

Automated-response module 220 may post automated digital response 218 in a variety of ways, depending on the type of response represented by automated digital response 218. In some examples (e.g., in embodiments in which automated digital response 218 represents an emoji), automated-response module 220 may digitally affix automated digital response 218 to post 208. FIG. 3 provides a specific example of a set of emojis 302 that have been digitally affixed to post 208.

In embodiments in which automated digital response 218 represents a pre-populated message, automated-response module 220 may post automated digital response 218 by posting the pre-populated message. In some examples, automated-response module 220 may post the pre-populated message within a same window as post 208 (e.g., in a comments section of consumption interface 210). In other examples, automated-response module 220 may post the pre-populated message within a private messaging interface.

Figure 6:
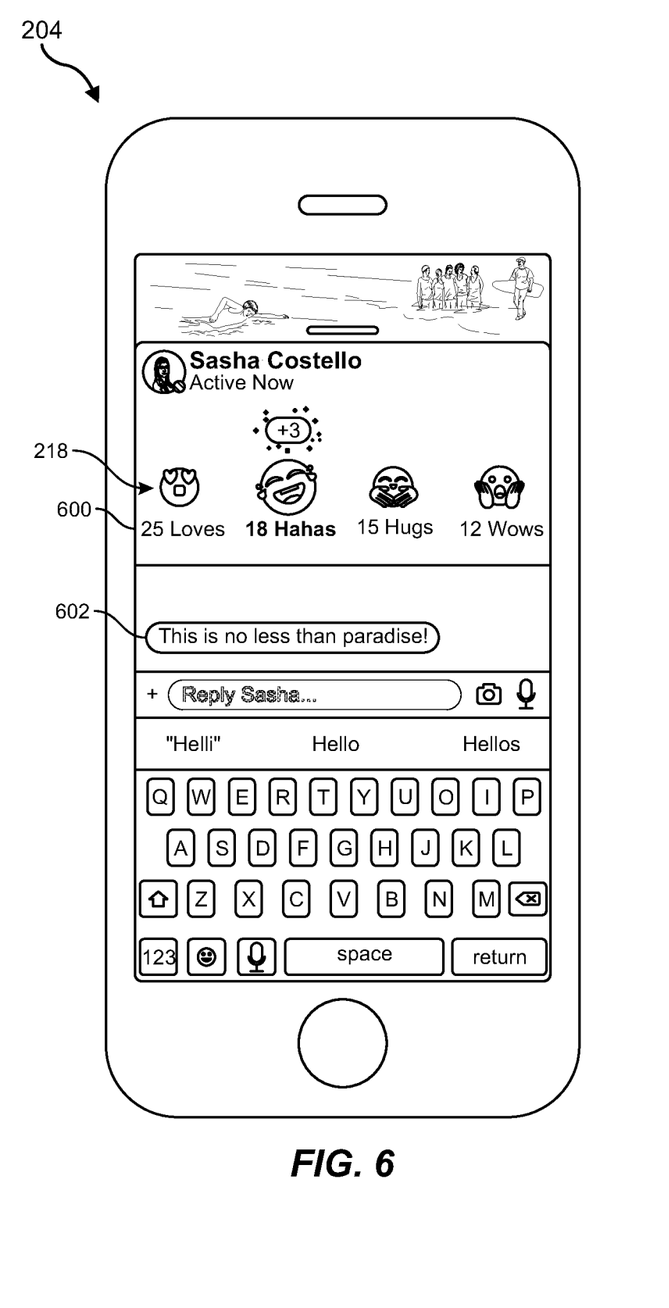
FIG. 6 is an illustration of an additional exemplary hover interface with additional exemplary automated digital reply elements.

FIG. 6 provides an exemplary illustration of a private messaging window 600 in which a pre-populated message 602 (i.e., "This is no less than paradise!") has been posted to the messaging window. In this illustration, prediction module 216 may have lifted the phrase "This is no less than paradise!" from text included within original post 208.

Figure 7:
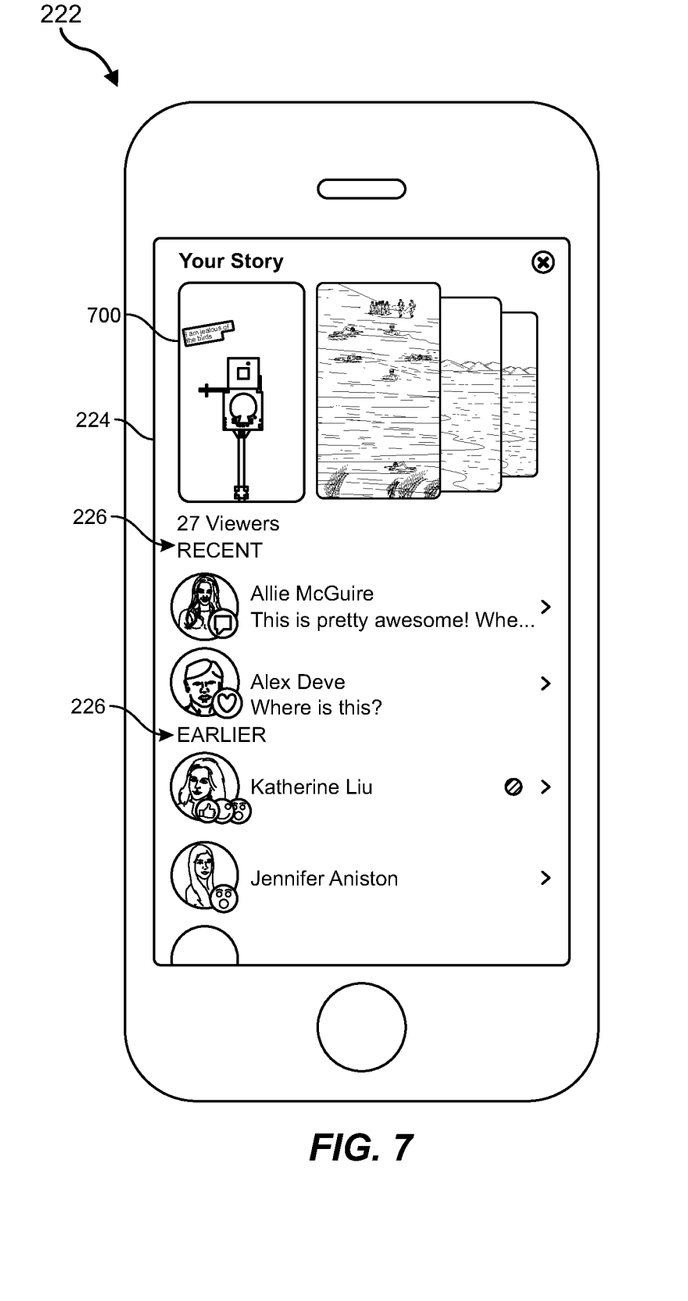
FIG. 7 is an illustration of an exemplary viewer summary sheet that summarizes the interactions of viewers with a digital social media composition.

In addition, or as an alternative, to providing automated responses for viewers of post 208, the disclosed systems and methods may provide automated responses for producers of posts 208 (e.g., producer 212). In one embodiment, a post-maintenance module may provide, within a window of an additional user device 222 being used by producer 212, a viewer summary sheet 224 that includes an interaction summary 226 of each interaction between viewers of post 208 (e.g., each viewer of post 208) and post 208. Such interactions may include, without limitation, one or more emojis posted to post 208, a list of viewers who have viewed post 208, a summary of one or more comments posted to post 208, and/or one or more messages sent in relation to post 208. FIG. 7 provides an exemplary illustration of viewer summary sheet 224 which summarizes the interactions of viewers with a digital story.

As illustrated in FIG. 7, a carousel 700 of thumbnails, one for each post within producer 212's digital story, may be displayed within viewer summary sheet 224. A summary of interactions may be displayed within viewer summary sheet 224 for a post corresponding to a thumbnail in a designated position (e.g., the leftmost position in FIG. 7). In one embodiment, the viewer summary sheet 224 may enable producer 212 to scroll through thumbnails, changing which thumbnail is positioned in the designated position. In this embodiment, the summary presented within viewer summary sheet 224 may change based on which thumbnail is in the designated position, such that the summary always corresponds to the post depicted in the thumbnail positioned in the designated position.

Figure 8:
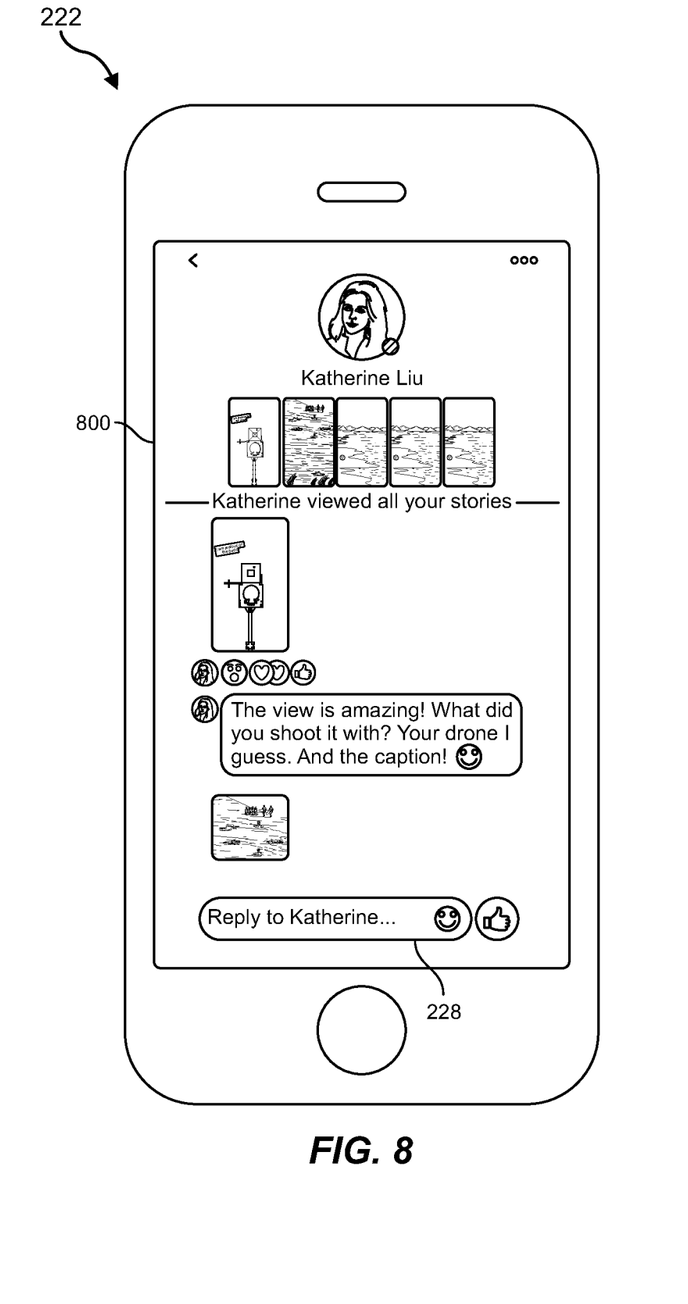
FIG. 8 is an illustration of an exemplary viewer-specific summary sheet that summarizes the interactions of a specific user with a digital social media composition.

In some examples, viewer summary sheet 224 may include a message-launching selection element (e.g., selection element 228) that may be selected (e.g., by producer 212) to initiate a private message exchange between producer 212 and the viewer. Returning to FIG. 7 as a specific example, the post-maintenance module may receive user input (e.g., from producer 212) selecting the viewer "Katherine Liu." In response, the post-maintenance module may present a viewer-specific summary interface, such as interface 800 depicted in FIG. 8, which may summarize each interaction that the selected viewer has had with a particular post and/or each interaction that the selected viewer has had with any post within producer 212's digital story. As depicted in FIG. 8, the viewer-specific summary interface may include a message-launching selection element (228) that, when selected by user input, initiates a private message exchange between producer 212 and the selected viewer.

In examples in which the disclosed automated reply system is implemented in a stories framework, the disclosed system may additionally provide one or more features directed at improving the control that a viewer has over his or her story-consumption experience. For example, in one embodiment, post-presentation module 214 may present a post within a digital story that includes audio. Post-presentation module 214 may be configured to display the post for a designated length of time before transitioning to displaying a subsequent post.

In this embodiment, a volume module may ease potential loudness anxiety that audio may elicit in a viewer in a variety of ways. For example, the volume module may fade in the volume of the audio at the beginning of the designated length of time (e.g., at a specified point within the designated length of time), such that the audio is initially played at an introductory noise-level that is lower (i.e., quieter) than a full noise level, which may be dictated by a current device setting. In some examples, the audio volume may fade in from no audio sound to the full noise level. Similarly, the volume module may fade out the volume of the audio at the end of the designated length of time (e.g., at a subsequent specified point within the designated length of time) to a conclusory noise-level that is lower (i.e., quieter) than the full noise level. The introductory and conclusory noise-levels may be the same or different.

In some embodiments, the volume module may additionally superimpose one or more volume control elements (e.g., a dial that increases or decreases a sound level) over the post within consumption interface 210. In these embodiments, the volume module may override the fade in or fade out behavior in response to receiving user input to the volume control elements. In one such embodiment, a volume control element may be persistently superimposed over the post as long as the post is being displayed. In other embodiments, a volume control element may only be presented for a designated length of time that is shorter than the length of time during which the post is displayed.

In one embodiment, the disclosed systems and methods may additionally include one or more automated visual changes to user interface elements (e.g., a reply element) that adjust based on a post's content. For example, a tint-adjustment module may (1) identify a color, contrast, brightness, and/or shadowing of content within a post being displayed and (2) select tint values for one or more user interface elements within the post based on the identified color, contrast, brightness, and/or shadowing.

In one such example, the tint-adjustment module may include two tints: a bright tint, which is relatively brighter than a dark tint, and the dark tint, which is relatively darker than the bright tint. In this example, the tint-adjustment module may select the bright tint for posts that the tint-adjustment module has designated as dark posts (e.g., based on the identified color, contrast, brightness, and/or shadowing of the post's content) and the dark tint for posts that the tint-adjustment module has designated as bright posts (e.g., based on the identified color, contrast, brightness, and/or shadowing of the post's content). In other examples, the tint-adjustment module may include more than two tints, each of which may be selected using a tint-selection algorithm based on color, contrast, brightness, and/or shadowing of content within the post being displayed.

In some examples (i.e., examples in which each post is configured to display for a default length of time), the disclosed systems and methods may additionally include a zoom module configured to enlarge the content of a post being displayed within consumption interface 160 when a designated balance of time within the default length of time remains (e.g., when two seconds remain). The zoom module may be configured to enlarge the post by any amount and/or percentage (e.g., 4%, 10% etc.).

In some embodiments, the disclosed systems and methods may additionally include a pause module. The pause module may pause the progression of post 208 and display one or more story-progression control elements in response to receiving user input (e.g., a tap to a screen of user device 204 while post 208 is being displayed). The control elements may include, without limitation, a skip-forward element that skips to a subsequent post, a skip-backward element that reverts to a previous post, a fast-forward element that speeds forward (e.g., plays forward while truncating the amount of time for which each post is displayed), and/or a fast-backward element that speeds backward (e.g., plays backward while truncating the amount of time for which each post is displayed).

As described throughout the instant disclosure, the present disclosure provides systems and methods for providing automated digital social media replies. In one example, a computer-implemented method may include (1) presenting a social media post (e.g., a digital story post and/or a digital newsfeed post) within a consumption interface of a social media platform, (2) predicting a viewer's response to the post and selecting an automated digital response (e.g., an emoji and/or digital text) that coincides with the predicted response, (3) providing a selectable version of the automated digital response within the consumption interface, (4) receiving user input selecting the automated digital response, and (5) in response to receiving the user input, posting the automated digital response to the post.

In some examples, predicting the viewer's response may include (1) determining that the automated digital response has already been posted to the social media post more than a threshold amount and (2) predicting that the viewer's response will align with the automated digital response based on the automated digital response having been posted to the social media post more than the threshold amount. Additionally or alternatively, predicting the viewer's response may include (1) identifying content within the post, (2) identifying an emotion and/or a theme of the content, and (3) predicting a response that aligns with the emotion and/or the theme.

In one embodiment, predicting the viewer's response may include (1) identifying content within one or more previously posted responses to the post, (2) identifying an emotion and/or a theme of the content, and (3) predicting a response that aligns with the emotion and/or the theme. In some examples, posting the automated digital response may include digitally affixing the automated digital response to the post. Additionally or alternatively, (1) providing a selectable version of the automated digital response may include providing the viewer with a messaging window that includes the automated digital response as a pre-populated message within the messaging window and (2) posting the automated digital response may include posting the pre-populated message. In this example, the messaging window may represent (1) a private messaging window between the viewer and one or more producers of the post and/or (2) a public messaging window that may be accessed by any user with permission to access the post.

In some examples, the method may further include providing a producer of the post with a viewer summary sheet that includes a summary of each interaction between viewers of the post and the post. Such interactions may include, without limitation, one or more emojis posted to the post, viewers who have viewed the post, one or more comments posted to the post, and/or one or more messages sent in relation to the post. In one embodiment, the method may also include providing, within the viewer summary sheet, a message-launching selection element that may be selected to initiate a private message exchange between the producer and the viewer.

In one example, a corresponding system for implementing the above-described method may include (1) a post-presentation module, stored in memory, that presents a social media post within a consumption interface of a social media platform, (2) a prediction module, stored in memory, that predicts a viewer's response to the post and selects an automated digital response that coincides with the predicted response, and (3) an automated-response module, stored in memory, that (i) provides a selectable version of the automated digital response within the consumption interface, (ii) receives user input selecting the automated digital response, and (iii) in response to receiving the user input, posts the automated digital response to the post. The system may also include a physical processor configured to execute the post-presentation module, the prediction module, and the automated-response module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) present a social media post within a consumption interface of a social media platform, (2) predict a viewer's response to the post and select an automated digital response that coincides with the predicted response, (3) provide a selectable version of the automated digital response within the consumption interface, (4) receive user input selecting the automated digital response, and (5) in response to receiving the user input, post the automated digital response to the post.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   presenting a particular post, from a social media story comprising a plurality of posts, within a consumption interface configured for a particular viewer, wherein:
      the consumption interface comprises a post-response area for viewer responses to the particular post; and
      the post-response area enables the selection of one or more emojis to be posted to the particular post as a viewer response to the particular post;
   determining that more than a threshold amount of emojis, already posted to the particular post by other viewers, have been emojis with a particular image;
   based on the determination:
      predicting that the particular viewer will be interested in posting an emoji with the particular image to the particular post; and
      providing a selectable emoji with the particular image within the post-response area;
   providing a producer of the social media story with a viewer summary sheet interface comprising a horizontally scrollable digital carousel of thumbnails, each thumbnail corresponding to a different post of the social media story; and
   in response to receiving horizontal user scrolling input to the digital carousal that places a thumbnail, from the digital carousal, in a designated position, presenting, within the viewer summary sheet interface, a vertically scrollable summary of each interaction that a viewer of the social media story has had with a post corresponding to the thumbnail, the vertically scrollable summary comprising a summary of interactions from a plurality of different viewers.

2. The computer-implemented method of claim 1, wherein a vertical placement of the digital carousal is statically maintained in a designated portion of viewer summary sheet interface.

3. The computer-implemented method of claim 1, wherein the vertically scrollable summary of each interaction comprises at least one of:
   one or more emojis posted to the post corresponding to the thumbnail;
   a viewing of the post corresponding to the thumbnail;
   one or more comments posted to the post corresponding to the thumbnail; or one or more messages sent in relation to the post corresponding to the thumbnail.

4. The computer-implemented method of claim 1, wherein the plurality of posts consists of posts added to the social media story by the producer within a designated time period.

5. The computer-implemented method of claim 1, further comprising:
 receiving user input, to the vertically scrollable summary, selecting an entry for the particular viewer from viewers included within the vertically scrollable summary; and
 in response to receiving the user input, providing a viewer-specific summary interface, corresponding to the particular viewer, that summarizes each interaction the particular viewer has had with the post corresponding to the thumbnail.

6. The computer-implemented method of claim 5, wherein the viewer-specific summary interface further comprises a summary of each interaction the particular viewer has had with any post of the social media story.

7. The computer-implemented method of claim 5, wherein the viewer-specific summary interface further comprises a message-launching element configured to launch a private message between the producer and the particular viewer when selected via user input.

8. The computer-implemented method of claim 1, wherein the viewer summary sheet interface is accessible to only the producer of the social media story.

9. The computer-implemented method of claim 1, further comprising, while providing the viewer summary sheet interface and in response to receiving additional horizontal user scrolling input to the digital carousal that places an additional thumbnail, from the digital carousal, in the designated position, replacing the vertically scrollable summary of each interaction a viewer of the social media story has had with the post corresponding to the thumbnail with a vertically scrollable summary of each interaction a viewer of the social media story has had with an additional post corresponding to the additional thumbnail.

10. The computer-implemented method of claim 1, wherein determining that more than a threshold amount of the emojis, already posted to the particular post, have been emojis with the particular image comprises at least one of:
 determining that more than a threshold number of the emojis, already posted to the particular post, have been emojis with the particular image; or
 determining that more than a threshold percentage of the emojis, already posted to the particular post, have been emojis with the particular image.

11. The computer-implemented method of claim 1, further comprising:
 identifying content within the particular post;
 identifying at least one of an emotion or a theme of the content;
 predicting that the particular viewer's response to the particular post will align with at least one of the emotion or the theme;
 generating an automated digital response that coincides with at least one of the emotion or the theme; and
 providing a selectable version of the automated digital response within the post-response area.

12. The computer-implemented method of claim 1, further comprising:
 identifying content within one or more previously posted responses to the particular post;
 identifying at least one of an emotion or a theme of the content;
 predicting that the viewer's response to the particular post will align with at least one of the emotion or the theme;
 generating an automated digital response that coincides with at least one of the emotion or the theme; and
 providing a selectable version of the automated digital response within the post-response area.

13. The computer-implemented method of claim 1, further comprising, in addition to providing the selectable emoji with the particular image within the post-response area, providing a generic automated response within the post-response area.

14. The computer-implemented method of claim 1, further comprising:
 receiving user input to the post-response area of the consumption interface selecting the selectable emoji with the particular image from the post-response area; and
 in response to receiving the user input, posting the emoji with the particular image to the particular post on behalf of the particular viewer.

15. The computer-implemented method of claim 14, wherein posting the emoji with the particular image to the particular post comprises digitally affixing the emoji with the particular image to the particular post within the post-response area.

16. The computer-implemented method of claim 1, wherein the emoji with the particular image comprises at least one of an emoji with a sad face, an emoji with a heart, or an emoji with a smiling face.

17. A system comprising:
 a post-maintenance module, stored in memory, that:
  presents a particular post, from a social media story comprising a plurality of posts, within a consumption interface configured for a particular viewer, wherein:
   the consumption interface comprises a post-response area for viewer responses to the particular post; and
   the post-response area enables the selection of one or more emojis to be posted to the particular post as a viewer response to the particular post;
  determines that more than a threshold amount of emojis, already posted to the particular post by other viewers, have been emojis with a particular image;
  based on the determination:
   predicts that the particular viewer will be interested in posting an emoji with the particular image to the particular post; and
   provides a selectable emoji with the particular image within the post-response area;
  provides a producer of the social media story with a viewer summary sheet interface comprising a horizontally scrollable digital carousel of thumbnails, each thumbnail corresponding to a different post of the social media story;
  in response to receiving horizontal user scrolling input to the digital carousal that places a thumbnail, from the digital carousal, in a designated position, presents, within the viewer summary sheet interface, a vertically scrollable summary of each interaction that a viewer of the social media story has had with a post corresponding to the thumbnail, the vertically scrollable summary comprising a summary of interactions from a plurality of different viewers; and at least one physical processor configured to execute the post-maintenance module.

18. The system of claim 17, wherein a vertical placement of the digital carousal is statically maintained in a designated portion of viewer summary sheet interface.

19. The system of claim 17, wherein the vertically scrollable summary of each interface comprises at least one of:
- one or more emojis posted to the post corresponding to the thumbnail;
- a viewing of the post corresponding to the thumbnail;
- one or more comments posted to the post corresponding to the thumbnail; or
- one or more messages sent in relation to the post corresponding to the thumbnail.

20. A non-transitory computer-readable medium comprising one or more computer-readable instructions that, when executed by at least one processor of a computing device, cause the computing device to:
- present a particular post, from a social media story comprising a plurality of posts, within a consumption interface configured for a particular viewer, wherein:
  - the consumption interface comprises a post-response area for viewer responses to the particular post; and
  - the post-response area enables the selection of one or more emojis to be posted to the particular post as a viewer response to the particular post;
- determine that more than a threshold amount of emojis, already posted to the particular post by other viewers, have been emojis with a particular image;
- based on the determination:
  - predict that the particular viewer will be interested in posting an emoji with the particular image to the particular post; and
  - provide a selectable emoji with the particular image within the post-response area;
- provide a producer of the social media story with a viewer summary sheet interface comprising a horizontally scrollable digital carousel of thumbnails, each thumbnail corresponding to a different post of the social media story; and
- in response to receiving horizontal user scrolling input to the digital carousal that places a thumbnail, from the digital carousal, in a designated position, present, within the viewer summary sheet interface, a vertically scrollable summary of each interaction that a viewer of the social media story has had with a post corresponding to the thumbnail, the vertically scrollable summary comprising a summary of interactions from a plurality of different viewers.

* * * * *